(12) United States Patent
Murata et al.

(10) Patent No.: US 9,071,718 B2
(45) Date of Patent: Jun. 30, 2015

(54) INFORMATION PROCESSING APPARATUS, IMAGE FORMING APPARATUS, NON-TRANSITORY COMPUTER READABLE MEDIUM STORING PROGRAM, AND INFORMATION PROCESSING METHOD

(75) Inventors: Yuji Murata, Kanagawa (JP); Shinho Ikeda, Kanagawa (JP); Masakazu Kawashita, Kanagawa (JP); Hideki Yamasaki, Kanagawa (JP); Tadamasa Sakamaki, Kanagawa (JP); Binhui Liu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 97 days.

(21) Appl. No.: 13/587,338

(22) Filed: Aug. 16, 2012

(65) Prior Publication Data
US 2013/0229681 A1  Sep. 5, 2013

(30) Foreign Application Priority Data

Mar. 5, 2012 (JP) ................................. 2012-048023

(51) Int. Cl.
*H04N 1/00* (2006.01)
*G06K 15/00* (2006.01)

(52) U.S. Cl.
CPC ........ *H04N 1/00965* (2013.01); *G06K 15/4055* (2013.01); *H04N 1/00928* (2013.01)

(58) Field of Classification Search
IPC ....... G06F 3/12,3/00, 5/00, 17/30, 12/00; H04N 1/40
See application file for complete search history.

(56) References Cited

U.S. PATENT DOCUMENTS

| | | | | |
|---|---|---|---|---|
| 5,666,135 A | * | 9/1997 | Taki | 715/780 |
| 5,742,742 A | * | 4/1998 | Ueda | 358/1.9 |
| 6,259,534 B1 | * | 7/2001 | Akiyama | 358/1.16 |
| 6,486,969 B1 | * | 11/2002 | Maruyama | 358/1.15 |
| 8,312,184 B2 | * | 11/2012 | Ito et al. | 710/36 |
| 2005/0020340 A1 | * | 1/2005 | Cannon | 463/16 |
| 2007/0050852 A1 | * | 3/2007 | Yoshii et al. | 726/27 |
| 2008/0137145 A1 | * | 6/2008 | Takemura et al. | 358/3.03 |
| 2010/0235601 A1 | * | 9/2010 | Cortopassi et al. | 711/166 |
| 2011/0181919 A1 | * | 7/2011 | Okutsu | 358/448 |
| 2012/0072710 A1 | * | 3/2012 | Gupta et al. | 713/2 |
| 2013/0082339 A1 | * | 4/2013 | Aggarwal et al. | 257/421 |
| 2013/0235419 A1 | * | 9/2013 | Ikeda et al. | 358/1.15 |
| 2013/0250354 A1 | * | 9/2013 | Kato et al. | 358/1.15 |
| 2013/0332651 A1 | * | 12/2013 | Iida et al. | 711/103 |
| 2013/0346674 A1 | * | 12/2013 | Yeh | 711/103 |

FOREIGN PATENT DOCUMENTS

| | | | | |
|---|---|---|---|---|
| JP | A-2004-78043 | | 3/2004 | |
| JP | 2013-187608 | * | 9/2013 | ............... H04N 1/00 |

* cited by examiner

*Primary Examiner* — Jerome Grant, II
(74) *Attorney, Agent, or Firm* — Oliff PLC (57) ABSTRACT

An information processing apparatus includes an execution unit that executes a program, a main storage unit that includes a first non-volatile memory which is readable and writable and is capable of retaining stored information even when no power is supplied and is provided with a first storage area which stores the program executed by the execution unit and a second storage area which stores data generated by the execution of the program by the execution unit, a connection unit that connects the execution unit and the main storage unit, and a condition storage unit that includes a second non-volatile memory which is readable and writable and is capable of retaining stored information even when no power is supplied and stores conditions which are set by the connection unit to transmit and receive the program and the data between the execution unit and the main storage unit.

13 Claims, 10 Drawing Sheets

INFORMATION PROCESSING APPARATUS, IMAGE FORMING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2012-048023 filed Mar. 5, 2012.

BACKGROUND

Technical Field

The present invention relates to an information processing apparatus, an image forming apparatus, a non-transitory computer readable medium storing a program, and an information processing method.

SUMMARY

According to an aspect of the invention, there is provided an information processing apparatus including: an execution unit that executes a program; a main storage unit that includes a first non-volatile memory which is readable and writable and is capable of retaining stored information even when no power is supplied and is provided with a first storage area which stores the program executed by the execution unit and a second storage area which stores data generated by the execution of the program by the execution unit; a connection unit that connects the execution unit and the main storage unit; and a condition storage unit that includes a second non-volatile memory which is readable and writable and is capable of retaining stored information even when no power is supplied and stores conditions which are set by the connection unit to transmit and receive the program and the data between the execution unit and the main storage unit.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the invention will be described in detail with reference to the accompanying drawings.

Figure 1:
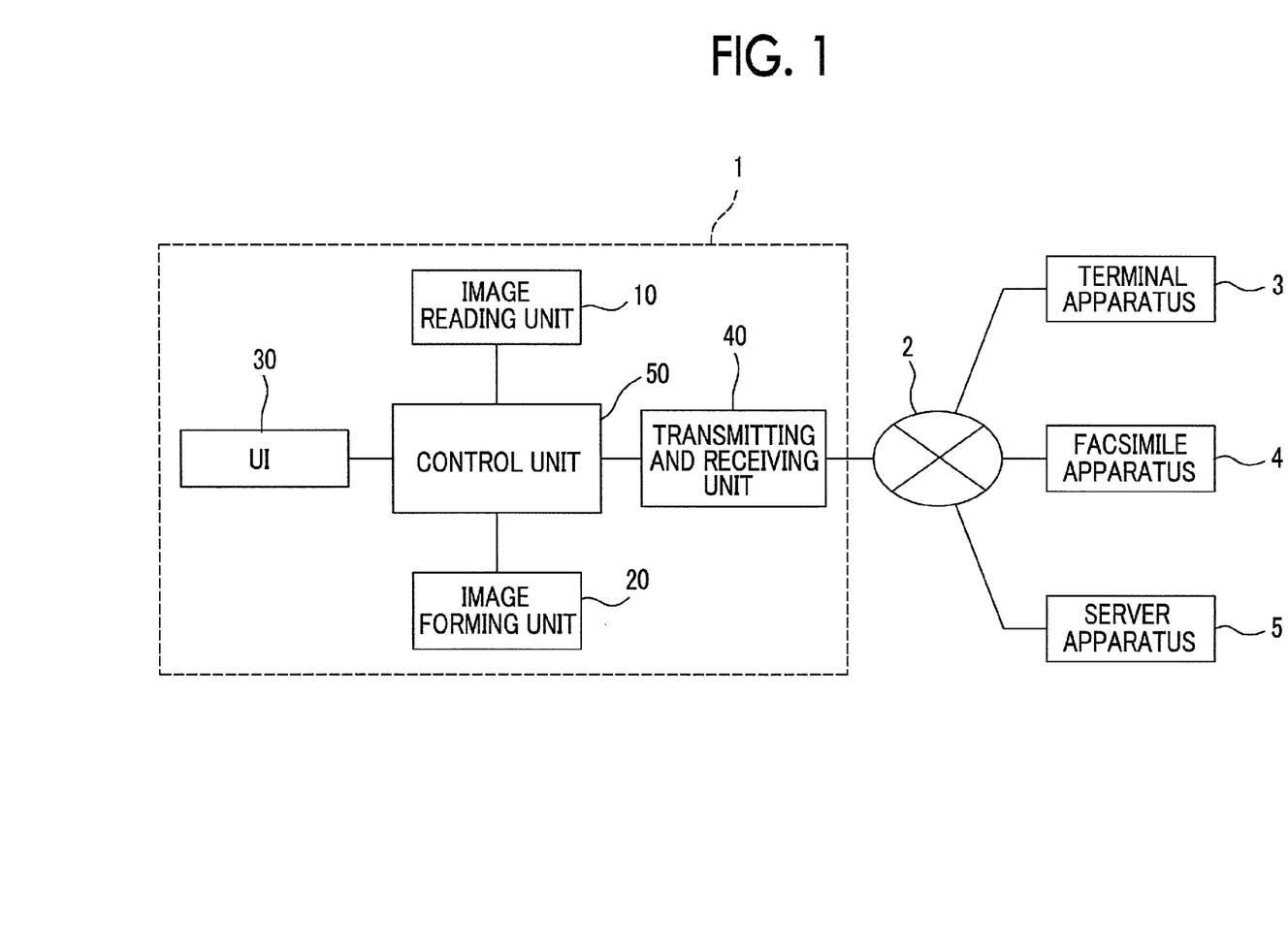
FIG. 1 is a diagram illustrating an example of the structure of an image forming system according to an exemplary embodiment.

FIG. 1 is a diagram illustrating an example of the structure of an image forming system according to this exemplary embodiment.

The image forming system includes an image forming apparatus 1 that operates as a so-called multi-function machine having a scanning function, a print function, a copy function, and a facsimile function, a network 2 connected to the image forming apparatus 1, a terminal apparatus 3 connected to the network 2, a facsimile apparatus 4 connected to the network 2, and a server apparatus 5 connected to the network 2.

The network 2 is, for example, an Internet line or a telephone line. The terminal apparatus 3 instructs the image forming apparatus 1 to perform, for example, an image forming process through the network 2 and is, for example, a PC (Personal Computer). The facsimile apparatus 4 transmits and receives a facsimile to and from the image forming apparatus 1 through the network 2. The server apparatus 5 transmits and receives data (including a program) to and from the image forming apparatus 1 through the network 2.

In addition, the image forming apparatus 1 includes an image reading unit 10 that reads an image recorded on a recording medium, such as paper, an image forming unit 20 that forms an image on a recording medium, such as paper, a user interface (UI) 30 that receives instructions related to a power on/off operation and operations using a scanning function, a print function, a copy function, and a facsimile function from the user and displays a message to the user, a transmitting and receiving unit 40 that transmits and receives data to and from the terminal apparatus 3, the facsimile apparatus 4, and the server apparatus 5 through the network 2, and a control unit 50 that controls the operations of the image reading unit 10, the image forming unit 20, the UI 30, and the transmitting and receiving unit 40. In the image forming apparatus 1, the scanning function is implemented by the image reading unit 10, the print function is implemented by the image forming unit 20, the copy function is implemented by the image reading unit 10 and the image forming unit 20, and the facsimile function is implemented by the image reading unit 10, the image forming unit 20, and the transmitting and receiving unit 40. In addition, for example, the transmitting and receiving units for the Internet line and the telephone line may be separately provided.

Figure 2:
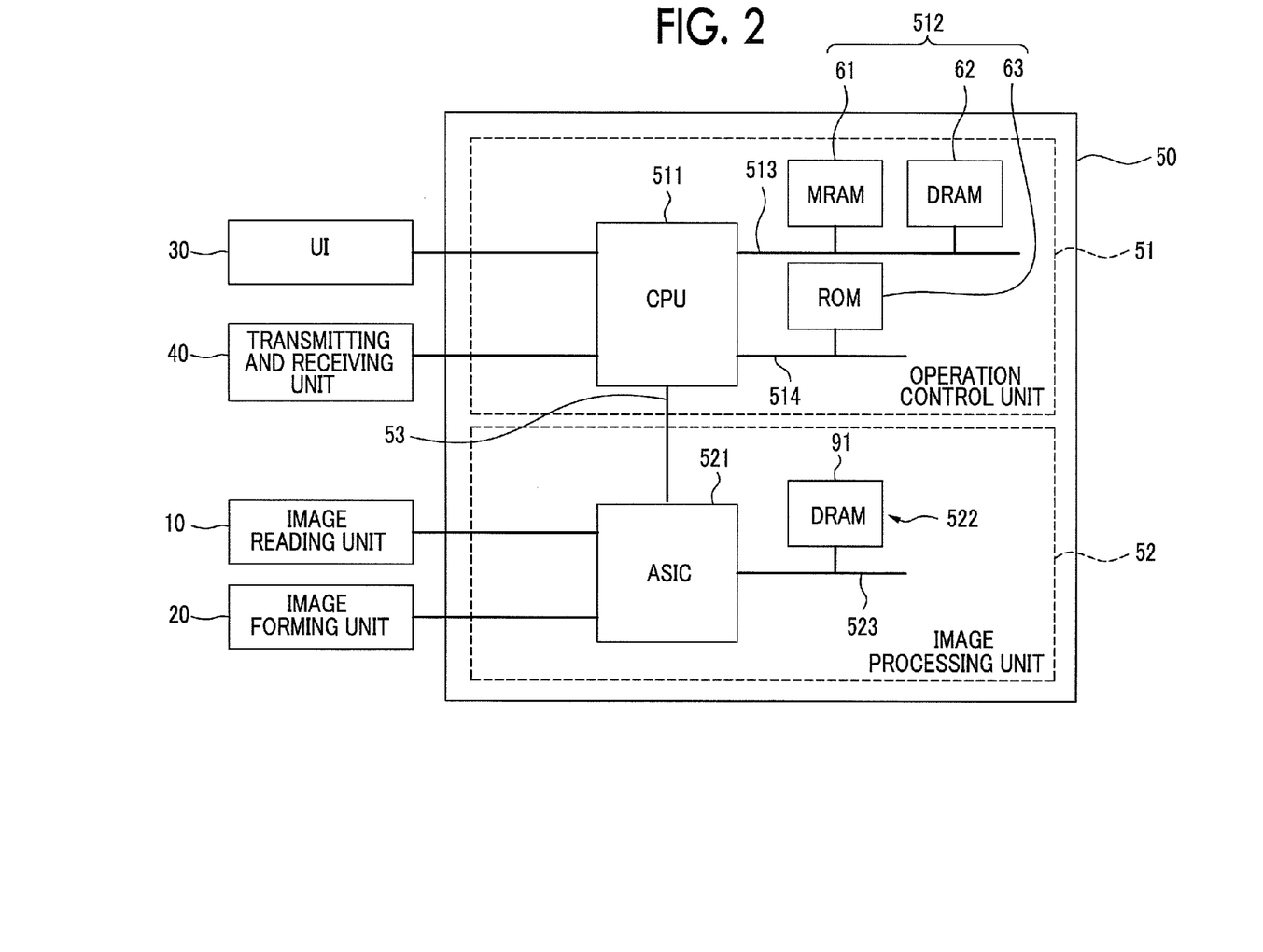
FIG. 2 is a block diagram illustrating an example of the internal structure of a control unit provided in the image forming apparatus.

FIG. 2 is a block diagram illustrating an example of the internal structure of the control unit 50 which is provided in the image forming apparatus 1 shown in FIG. 1.

The control unit 50 according to this exemplary embodiment includes an operation control unit 51 that controls the operation of each unit of the image forming apparatus 1, an image processing unit 52 that performs image processing related to the image reading unit 10 and the image forming unit 20, and a PCIe (PCI Express) bus 53 that connects the operation control unit 51 and the image processing unit 52.

Among them, the operation control unit 51 includes a CPU (Central Processing Unit) 511 that performs various kinds of operations to control each unit of the image forming apparatus 1, a CPU-MRAM module 61 and a CPU-DRAM module 62 that are connected to the CPU 511 through a CPU-RAM bus 513, and a CPU-ROM module 63 that is connected to the CPU 511 through a CPU-ROM bus 514. In the following description, the CPU-MRAM module 61, the CPU-DRAM module 62, and the CPU-ROM module 63 connected to the CPU 511 are referred to as a main memory 512. The operation control unit 51 is configured such that the CPU 511 directly reads and writes data from and to the main memory 512.

The CPU-MRAM module 61 includes an MRAM (Magnetoresistive RAM) as a memory device and functions as a non-volatile memory that is capable of retaining stored information even when no power is supplied. The CPU-DRAM module 62 includes a DRAM (Dynamic RAM) as a memory device and functions as a volatile memory that is not capable of retaining stored information when no power is supplied. In this exemplary embodiment, the CPU-MRAM module 61 and the CPU-DRAM module 62 read and write data at a common clock frequency (memory clock) set to the CPU-RAM bus 513. Therefore, the CPU-MRAM module 61 may have the same reading and writing functions as the CPU-DRAM module 62. The CPU-MRAM module 61 may read and write data at a high speed, as compared to a non-volatile memory, such as a UV-EPROM (Ultra-Violet Erasable Programmable ROM), an EEPROM (Electrically Erasable Programmable ROM), or a flash memory.

The CPU-DRAM module 62 according to this exemplary embodiment is, for example, a DDR2-SDRAM (Double-Data-Rate2 Synchronous Dynamic Random Access Memory).

In contrast, the CPU-ROM module 63 is a so-called mask ROM, various PROMs (Programmable ROMs: for example, an OTP ROM (One Time Programmable ROM), a UV-EPROM (Ultra-Violet Erasable Programmable ROM), and an EEPROM (Electrically Erasable Programmable ROM)), or a flash memory. In this example, a flash memory is used as the CPU-ROM module 63.

The image processing unit 52 includes an ASIC (Application Specific Integrated Circuit) 521 that performs various kinds of calculation to process image data input from the image reading unit 10 and image data to be output to the image forming unit 20 and a main memory 522 that is connected to the ASIC 521 through an ASIC-RAM bus 523. The main memory 522 provided in the image processing unit 52 includes an ASIC-DRAM module 91 that has the same structure as the CPU-DRAM module 62.

The PCIe bus 53 connecting the operation control unit 51 and the image processing unit 52 performs transmission and reception based on the PCI Express standard to connect the CPU 511 provided in the operation control unit 51 and the ASIC 521 provided in the image processing unit 52 in the control unit 50. In this example, the ASIC 521 performs various kinds of image processing on the basis of instructions received from the CPU 511 through the PCIe bus 53.

Figure 3:
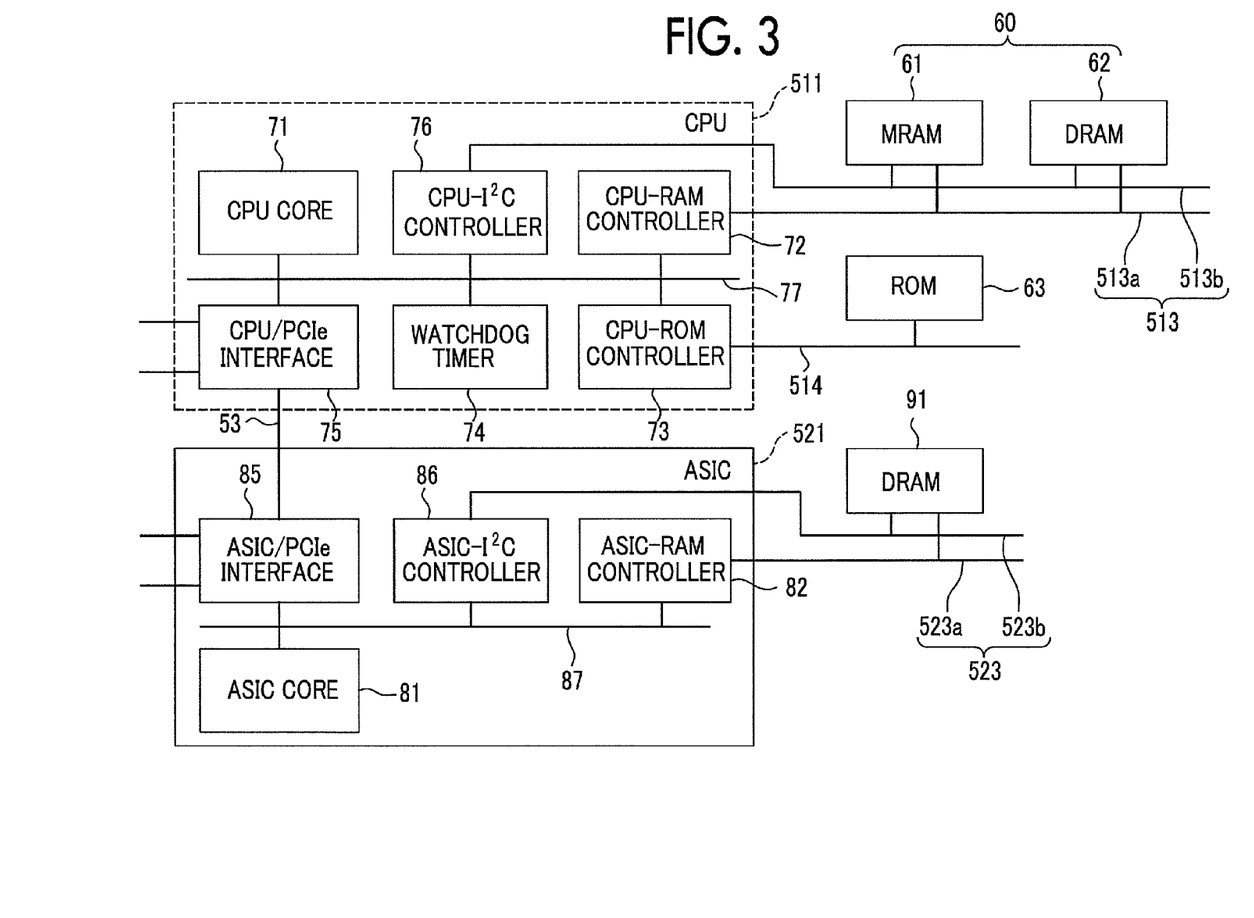
FIG. 3 is a block diagram illustrating an example of the internal structure of a CPU and an ASIC provided in the control unit.

FIG. 3 is a block diagram illustrating an example of the internal structure of the CPU 511 and the ASIC 521 provided in the control unit 50 shown in FIG. 2. In the following description, in the main memory 512 connected to the CPU 511, the CPU-MRAM module 61 and the CPU-DRAM module 62 connected to the CPU-RAM bus 513 are referred to as a CPU-RAM module 60 (an example of a main storage unit).

First, the internal structure of the CPU 511 will be described.

The CPU 511 includes a CPU core 71 which is an example of an execution unit performing various kinds of calculation on the basis of a program, a CPU-RAM controller 72 that controls the transmission and reception of data between the CPU core 71 and the CPU-RAM module 60, and a CPU-ROM controller 73 that controls the transmission and reception of data between the CPU core 71 and the CPU-ROM module 63. In addition, the CPU 511 includes a watchdog timer (WDT) 74 that is used to detect an error when the CPU core 71 executes the program, a CPU/PCIe interface 75 that controls the transmission and reception of data between the CPU core 71 and the outside (for example, ASIC 521), and a CPU-I$^2$C controller 76 that controls the transmission and reception of data between the CPU core 71 and the CPU-RAM module 60. The CPU 511 further includes a CPU internal bus 77 that connects the CPU core 71, the CPU-RAM controller 72, the CPU-ROMcontroller 73, the watchdog timer 74, the CPU/PCIe interface 75, and the CPU-I$^2$C controller 76 in the CPU 511.

The CPU-RAM bus 513 according to this exemplary embodiment includes a memory bus 513a connected to the CPU-RAM controller 72 and an I$^2$C bus 513b connected to the CPU-I$^2$C controller 76. The transmission speed of data through the memory bus 513a is higher than that of data through the I$^2$C bus 513b. The transmission speed of data through the memory bus 513a of the CPU-RAM bus 513 is higher than that of data through the CPU-ROM bus 514.

Next, the internal structure of the ASIC 521 will be described.

The ASIC 521 includes an ASIC core 81 that performs various kinds of calculation, an ASIC-RAM controller 82 that controls the transmission and reception of data between the ASIC core 81 and the ASIC-DRAM module 91, an ASIC/PCIe interface 85 that controls the transmission and reception of data between the ASIC core 81 and the outside (for example, the CPU 511), and an ASIC-I$^2$C controller 86 that controls the transmission and reception of data between the ASIC core 81 and the ASIC-DRAM module 91. In addition, the ASIC 521 includes an ASIC internal bus 87 that connects the ASIC core 81, the ASIC-RAM controller 82, the ASIC/PCIe interface 85, and the ASIC-I$^2$C controller 86 in the ASIC 521.

The ASIC-RAM bus 523 according to this exemplary embodiment includes a memory bus 523a connected to the ASIC-RAM controller 82 and an I$^2$C bus 523b connected to the ASIC-I$^2$C controller 86. The transmission speed of data through the memory bus 523a is higher than that of data through the I$^2$C bus 523b.

Figure 4:
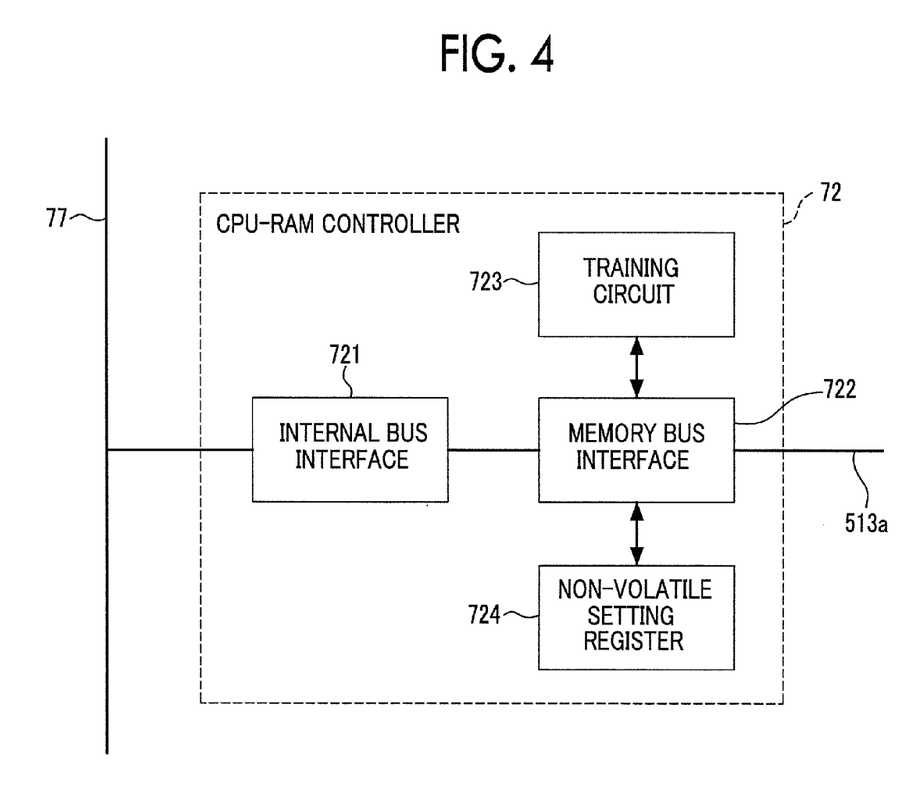
FIG. 4 is a block diagram illustrating an example of the internal structure of a CPU-RAM controller provided in the CPU.

FIG. 4 is a block diagram illustrating the internal structure of the CPU-RAM controller 72 provided in the CPU 511 shown in FIG. 3.

The CPU-RAM controller 72 which is an example of a connection unit includes an internal bus interface 721 that controls the transmission and reception of data to and from the CPU internal bus 77 and a memory bus interface 722 that is connected to the internal bus interface 721 and controls the transmission and reception of data to and from the memory bus 513a. In addition, the CPU-RAM controller 72 includes a training circuit 723 that performs a training sequence for optimizing the transmission and reception conditions of data when the CPU-RAM controller 72 and the CPU-RAM module 60 (see FIG. 3) are connected to each other through the memory bus 513a and a non-volatile setting register 724 that stores various set values (hereinafter, referred to as register set values) which are obtained on the basis of the result of the training sequence of the training circuit 723 and are set to the memory bus interface 722.

The non-volatile setting register 724 which is an example of a condition storage unit includes the same MRAM as the CPU-MRAM module 61 (see FIG. 3) and functions as a non-volatile memory that is capable of retaining stored information even when no power is supplied.

In this exemplary embodiment, the register set values are needed when data is transmitted between the CPU-RAM controller 72 and the CPU-RAM module 60 (the CPU-MRAM module 61 and the CPU-DRAM module 62) through the memory bus 513a. From the opposite point of view, until the register set values are decided, it is difficult to transmit data between the CPU-RAM controller 72 and the CPU-RAM module 60 through the memory bus 513a.

Figure 5A:
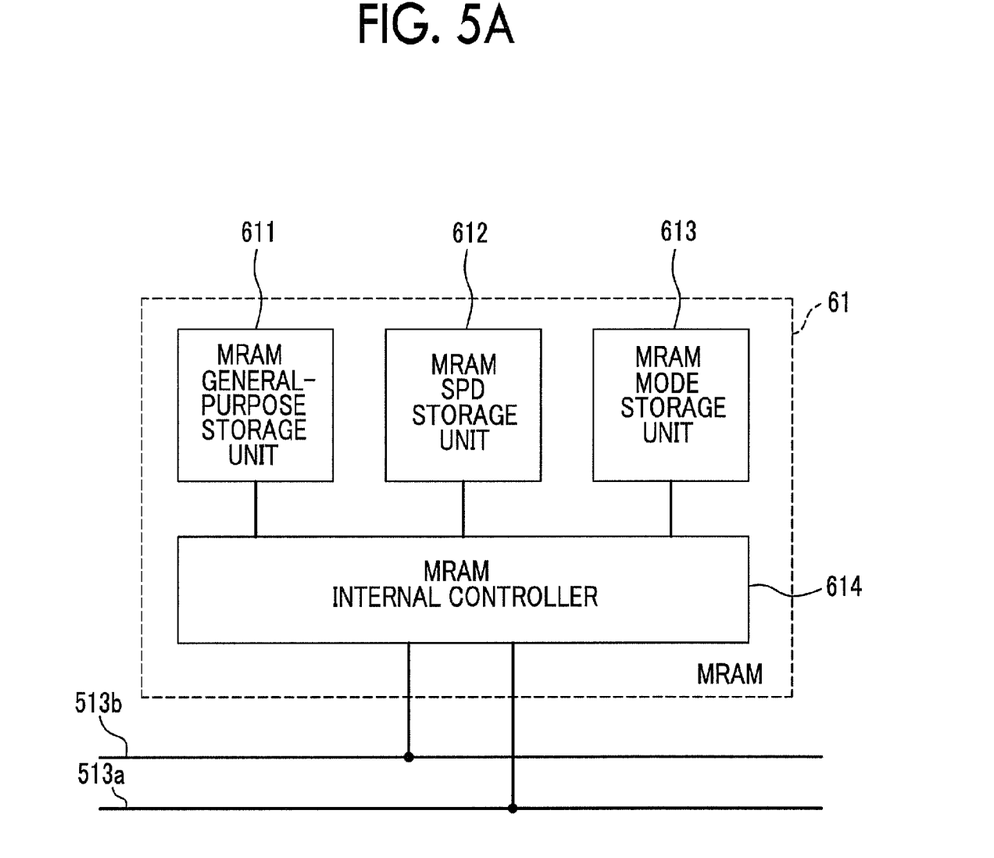
FIGS. 5A and 5B are block diagrams illustrating an example of the structure a CPU-RAM module provided in an operation control unit.
Figure 5B:
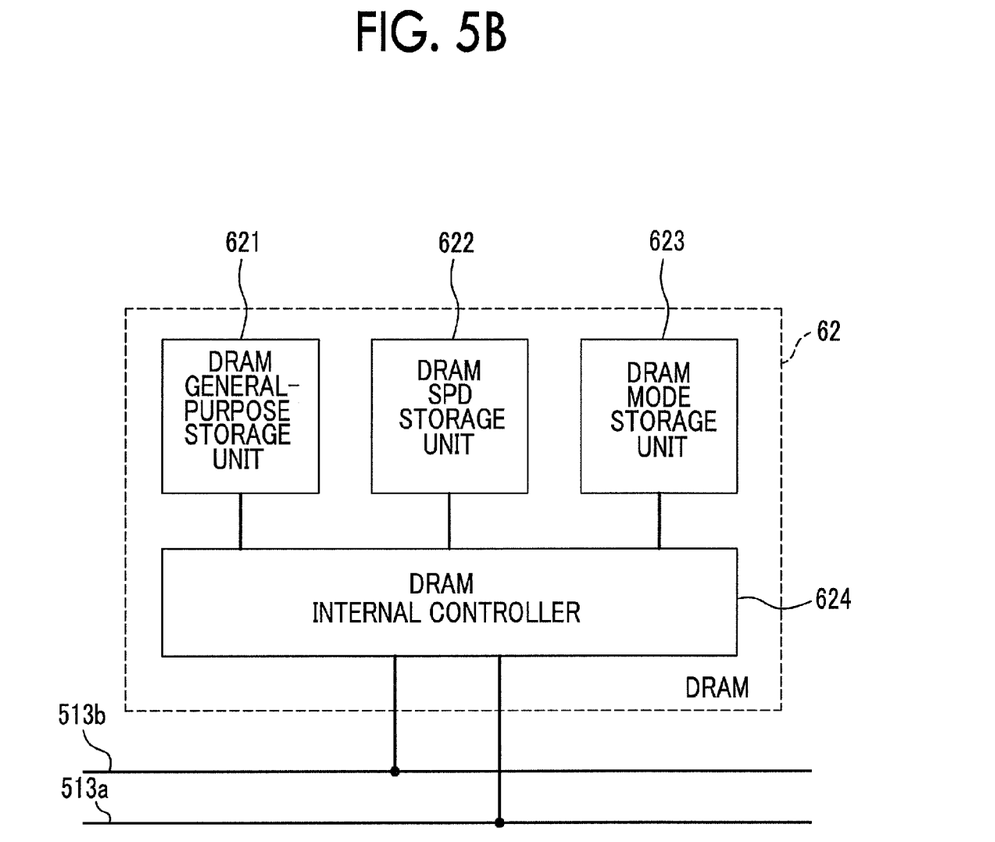

FIGS. 5A and 5B are block diagrams illustrating an example of the structure of the CPU-RAM module 60 provided in the operation control unit 51 shown in FIG. 2. Specifically, FIG. 5A is a block diagram illustrating an example of the internal structure of the CPU-MRAM module 61 connected to the CPU 511 and FIG. 5B is a block diagram illustrating an example of the internal structure of the CPU-DRAM module 62 connected to the CPU 511.

First, the internal structure of the CPU-MRAM module 61 will be described with reference to FIG. 5A.

The CPU-MRAM module 61 includes an MRAM general-purpose storage unit 611 that stores the program executed by the CPU 511 or work data generated when the program is executed, an MRAMSPD storage unit 612 that stores SPD (Serial Presence Detect) including characteristic information (for example, the maximum available clock frequency or signal timing) about the CPU-MRAM module 61, and an MRAM mode storage unit 613 that stores the operation mode of the CPU-MRAM module 61. In addition, the CPU-MRAM module 61 includes an MRAM internal controller 614 that performs data communication with the CPU-RAM controller 72 (see FIG. 3) through the memory bus 513a, performs data communication with the CPU-I$^2$C controller 76 through the I$^2$C bus 513b, and controls the reading and writing of data from and to the MRAM general-purpose storage unit 611, the MRAMSPD storage unit 612, and the MRAM mode storage unit 613.

The MRAM internal controller 614 controls the transmission and reception of data between the memory bus 513a and the MRAM general-purpose storage unit 611 and controls the transmission and reception of data between the I$^2$C bus 513b and the MRAMSPD storage unit 612 and between the I$^2$C bus 513b and the MRAM mode storage unit 613.

In this example, the MRAM general-purpose storage unit 611, the MRAMSPD storage unit 612, and the MRAM mode storage unit 613 are each an MRAM, but are not limited thereto. For example, the MRAM general-purpose storage unit 611 may be an MRAM and the MRAMSPD storage unit 612 and the MRAM modestorage unit 613 may be EEPROMs, considering the difference between the transmission speeds of the memory bus 513a and the I$^2$C bus 513b.

Next, the internal structure of the CPU-DRAM module 62 will be described with reference to FIG. 5B.

The CPU-DRAM module 62 includes a DRAM general-purpose storage unit 621 that stores, for example, work data generated when the CPU 511 executes the program, a DRAMSPD storage unit 622 that stores SPD of the CPU-DRAM module 62, and a DRAM mode storage unit 623 that stores the operation mode of the CPU-DRAM module 62. In addition, the CPU-DRAM module 62 includes a DRAM internal controller 624 that performs data communication with the CPU-RAM controller 72 (see FIG. 3) through the memory bus 513a, performs data communication with the CPU-I$^2$C controller 76 through the I$^2$C bus 513b, and controls the reading and writing of data from and to the DRAM general-purpose storage unit 621, the DRAMSPD storage unit 622, and the DRAM mode storage unit 623.

The DRAM internal controller 624 controls the transmission and reception of data between the memory bus 513a and the DRAM general-purpose storage unit 621 and controls the transmission and reception of data between the I$^2$C bus 513b and the DRAMSPD storage unit 622 and between the I$^2$C bus 513b and the DRAM mode storage unit 623.

In this example, the DRAM general-purpose storage unit 621 is a DRAM and the DRAMSPD storage unit 622 and the DRAM mode storage unit 623 are each, for example, an EEPROM.

The ASIC-DRAM module 91 (see FIG. 3) provided in the image processing unit 52 has the same structure as the CPU-DRAM module 62.

Figure 6:
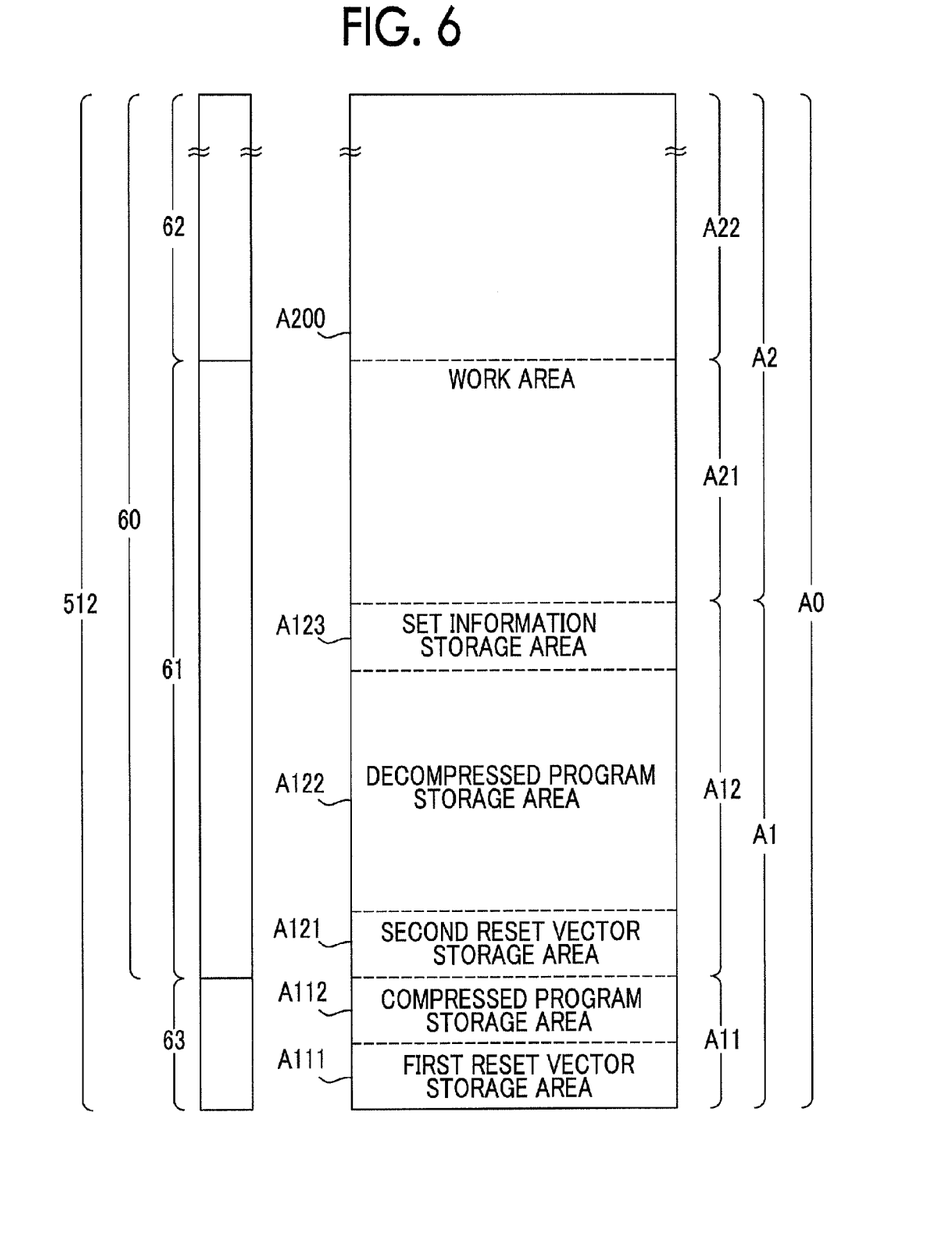
FIG. 6 is a diagram illustrating an example of the structure of a memory map of a main memory in the operation control unit.

FIG. 6 is a diagram illustrating an example of the structure of a memory map in the main memory 512 (the CPU-MRAM module 61, the CPU-DRAM module 62, and the CPU-ROM module 63) of the operation control unit 51 shown in FIG. 2. The CPU 511 provided in the operation control unit 51 reads and writes data from and to the main memory 512 on the basis of the memory map.

In the memory map shown in FIG. 6, a storage area A0, which is the entire area of the main memory 512, includes a ROM area A1 that is basically used as a ROM and a RAM area A2 that is basically used as a RAM. In this exemplary embodiment, the ROM area A1 is arranged across the CPU-ROM module 63 and the CPU-MRAM module 61 and the RAM area A2 is arranged across the CPU-MRAM module 61 and the CPU-DRAM module 62. Of them, the ROM area A1 includes a first ROM area A11 which is arranged in the CPU-ROM module 63 and in which the rewriting of data is not basically allowed and a second ROM area A12 which is provided in the CPU-MRAM module 61 and in which the rewriting of data is basically allowed. The RAM area A2 includes a first RAM area A21 which is arranged in the CPU-MRAM module 61 and a second RAM area A22 which is arranged in the CPU-DRAM module 62.

The first ROM area A11 forming the ROM area A1 includes a first reset vector storage area A111 and a compressed program storage area A112. Of them, the first reset vector storage area A111 stores a first IPL (Initial Program Loader), which is a program executed by the CPU 511 (see FIG. 2) of the operation control unit 51 when the image forming apparatus 1 starts up. The compressed program storage area A112 stores a compressed program file obtained by compressing the data of the program used to control the image forming apparatus 1.

The second ROM area A12, which is an example of a first storage area forming the ROM area A1 together with the first ROM area A11, includes a second reset vector storage area A121, a decompressed program storage area A122, and a set information storage area A123. Among them, the second reset vector storage area A121 stores a second IPL, which is a program executed by the CPU 511 (see FIG. 2) of the operation control unit 51 when the image forming apparatus 1 starts up. The decompressed program storage area A122 stores a decompressed program file obtained by decompressing the compressed program file read from the compressed program storage area A112 of the first ROM area A11 using the CPU 511. The set information storage area A123 stores, as set information, data whose content is the same as that of the register set value stored in the non-volatile setting register 724 (see FIG. 4) of the CPU-RAM controller 72.

In this example, the memory capacity of the decompressed program storage area A122 is more than that of the compressed program storage area A112. The reason is that, when the compressed file is decompressed, the size of the file increases.

In this exemplary embodiment, the first IPL is stored in the first reset vector storage area A111 arranged in the CPU-ROM module 63 and the second IPL is stored in the second reset vector area A121 arranged in the CPU-MRAM module 61. Therefore, in this exemplary embodiment, after the CPU 511 performs hardware reset (HW reset) in order to start the image forming apparatus 1, one of the first IPL and the second IPL is selectively executed, which will be described in detail below.

In this example, the first RAM area A21 and the second RAM area A22 forming the RAM area A2, which is an example of the second storage area, are used as a work area A200 that temporarily stores data generated when the CPU 511 executes the program or data for instructions which are output to each component of the image forming apparatus 1 when the CPU 511 performs a process. As such, in this exemplary embodiment, the RAM area A2 (work area A200) is formed by two memories (a portion of the CPU-MRAM module 61 and the entire CPU-DRAM module 62) with different storage systems. The CPU 511 treats the first RAM area A21 arranged in the CPU-MRAM module 61 and the second RAM area A22 arranged in the CPU-DRAM module 62 as the RAM area A2.

Figure 7:
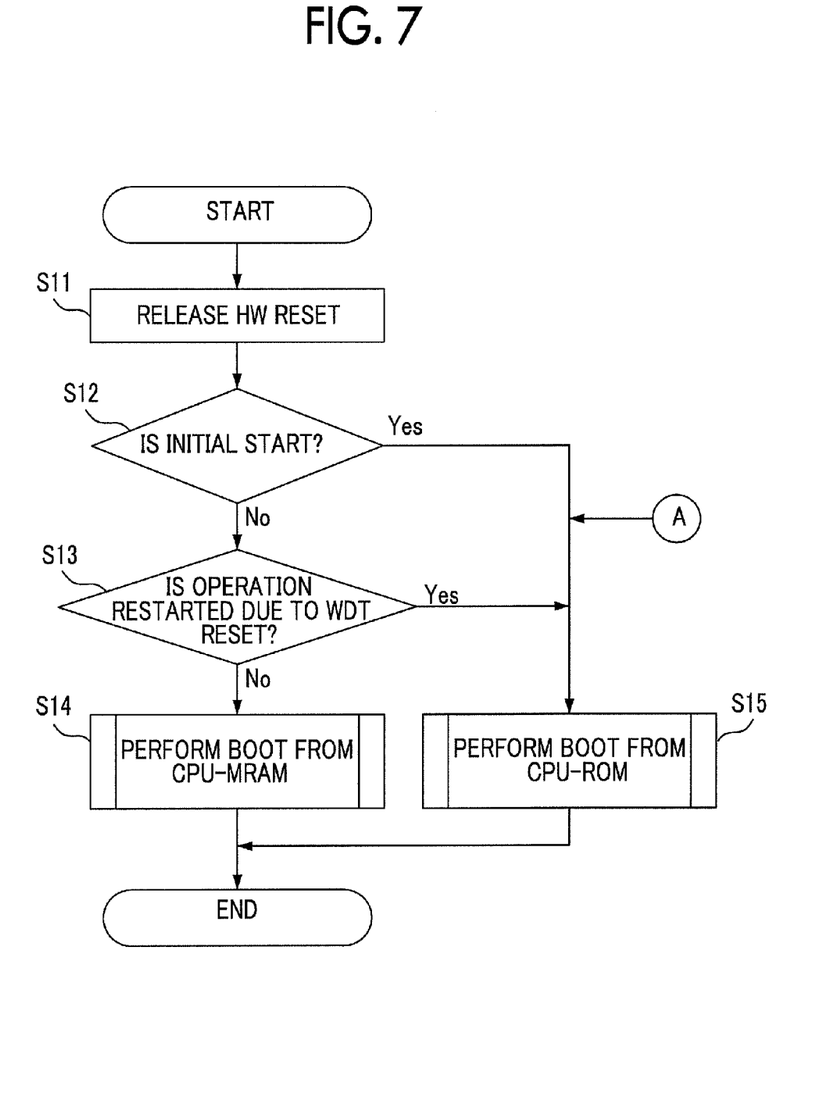
FIG. 7 is a flowchart illustrating the procedure of a boot selection process involved with an HW reset process.

FIG. 7 is a flowchart illustrating a process of starting the image forming apparatus 1 shown in FIG. 1. For example, the start process is performed when the UI 30 is operated to turn on the image forming apparatus 1 and an HW reset instruction is input to the control unit 50 (specifically, the CPU 511 of the operation control unit 51) and when the HW reset instruction is input to the control unit 50 for any reason after the image forming apparatus 1 is turned on. In this exemplary embodiment, for example, after the image forming apparatus 1 is turned on, the HW reset instruction is input to the control unit 50 when errors occur in the control unit 50 and when the image forming apparatus 1 is set to the energy saving mode (sleep mode) and then an instruction to return the operation mode to the normal mode is input to the control unit 50 through the UI 30. When the image forming apparatus 1 is set to the energy saving mode, the supply of power to the image reading unit 10 or the image forming unit 20 is stopped and the supply of power to each component (circuit) of the control unit 50 is also stopped.

An HW reset is performed on the CPU 511 provided in the operation control unit 51 of the control unit 50 when the start process starts and then the HW reset is released (Step 11). When the HW reset is released, it is determined whether the current start process is a first start process (first start) after the image forming apparatus 1 is installed (Step 12).

When the determination result in Step 12 is "No", that is, when the current start process is a second or subsequent start process, it is determined whether the current start process is a restart process due to a watchdog timer reset (WDT reset) based on the watchdog timer 74 (see FIG. 3) provided in the CPU 511 (Step 13).

When the determination result in Step 13 is "No", the CPU 511 performs a boot (hereinafter, referred to as a "MRAM boot") based on the second IPL which is read from the second reset vector storage area A121 of the second ROM area A12 arranged in the CPU-MRAM module 61 (Step 14).

On the other hand, when the determination result in Step 12 is "Yes" and the determination result in Step 13 is "Yes", the CPU 511 performs a boot (hereinafter, referred to as a "ROM boot") based on the first IPL which is read from the first reset vector storage area A111 of the first ROM area A11 arranged in the CPU-ROM module 63 (Step 15).

As such, in this exemplary embodiment, after the HW reset for the CPU 511 is released, a boot selection process of changing the IPL used in the start process is performed according to the state before the HW reset.

Figure 8:
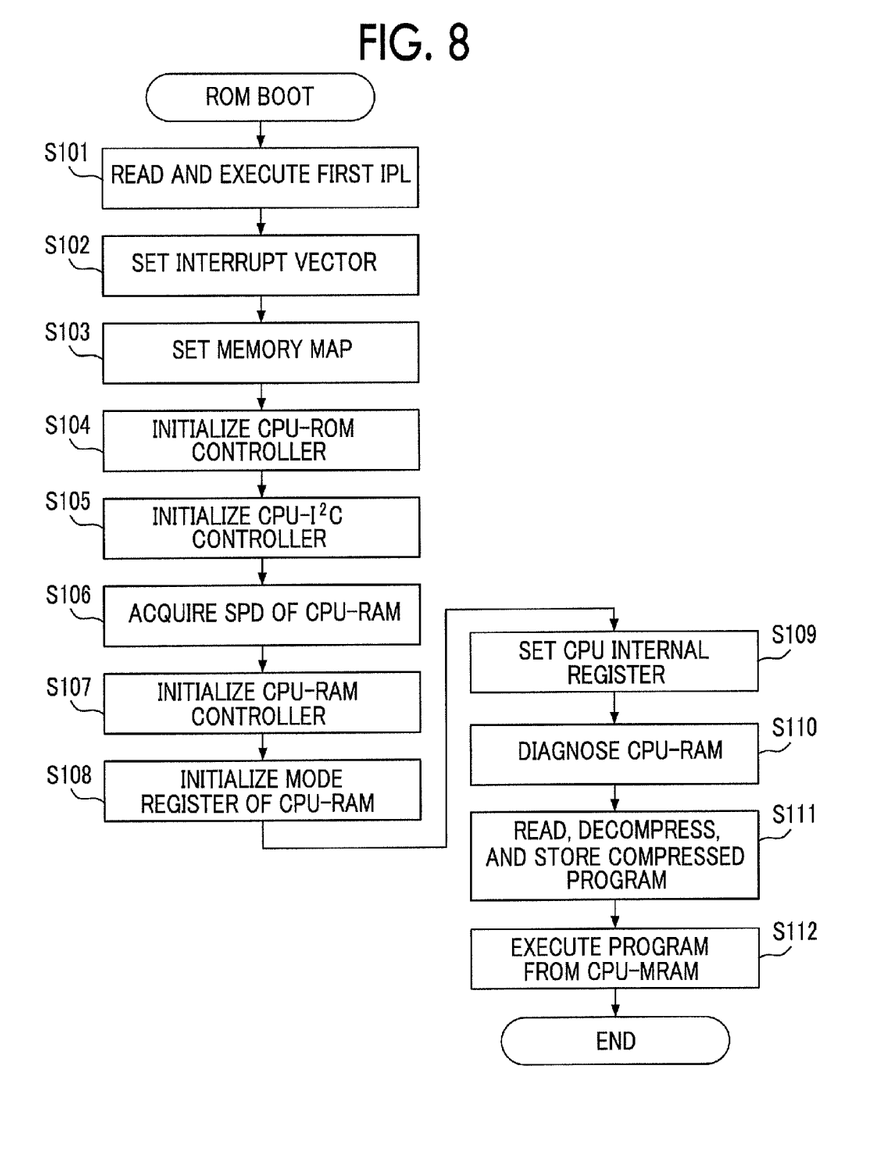
FIG. 8 is a flowchart illustrating the procedure of a start process during a ROM boot.

FIG. 8 is a flowchart illustrating the procedure of the start process during the ROM boot in Step 15.

During the ROM boot, first, the CPU core 71 reads the first IPL from the first reset vector storage area A111 of the first ROM area A11 arranged in the CPU-ROM module 63 through the CPU-ROM controller 73 and executes the first IPL (Step 101). Then, an interrupt vector is set (Step 102) and the memory map shown in FIG. 6 is set to the main memory 512 (Step 103).

Then, the CPU-ROM controller 73 is initialized (Step 104) and the CPU-I$^2$C controller 76 is initialized (Step 105). Then, each SPD is acquired from the MRAMSPD storage unit 612 provided in the CPU-MRAM module 61 and the DRAMSPD storage unit 622 provided in the CPU-DRAM module 62 in the CPU-RAM module 60 through the initialized CPU-I$^2$C controller 76 (Step 106).

Then, the CPU-RAM controller 72 is initialized (Step 107). In Step 107, the training circuit 723 performs a training sequence for optimizing the communication conditions of the CPU-RAM controller 72 and the CPU-RAM module 60 through the memory bus 513a on the basis of the SPDs acquired in Step 106 and obtains the optimized set value. Then, the result of the training sequence is written as the register set value to the non-volatile setting register 724 and is also stored as set information in the set information storage area A123 of the second ROM area A12 provided in the CPU-MRAM module 61 of the CPU-RAM module 60 through the memory bus 513a.

Then, the MRAM mode storage unit 613 provided in the CPU-MRAM module 61 and the DRAM mode storage unit 623 provided in the CPU-DRAM module 62 in the CPU-RAM module 60 are initialized (Step 108). Then, information about the operation mode which is obtained as the result of the training sequence is stored in each of the MRAM mode storage unit 613 provided in the CPU-MRAM module 61 and the DRAM mode storage unit 623 provided in the CPU-DRAM module 62.

Then, an internal register (not shown) provided in the CPU core 71 is set (Step 109) and the states of the MRAM general-purpose storage unit 611 provided in the CPU-MRAM module 61 and the DRAM general-purpose storage unit 621 provided in the CPU-DRAM module 62 in the CPU-RAM module 60 are diagnosed (checked) (it is checked whether errors occur in the storage units) (Step 110). In this example, the internal register of the CPU core 71 is a volatile memory.

Then, the CPU core 71 reads the compressed program file stored in the compressed program storage area A112 of the first ROM area A11 arranged in the CPU-ROM module 63, decompresses the read compressed program file, and stores the decompressed program file obtained by decompressing the compressed program file in the decompressed program storage area A122 of the second ROM area A12 arranged in the CPU-MRAM module 61 (Step 111).

Then, the CPU core 71 completes the execution of the first IPL and starts to execute the program (decompressed program) read from the decompressed program storage area A122 (Step 112). Then, for example, the initialization of the CPU/PCIe interface 75, the initialization of the ASIC 521 through the CPU/PCIe interface 75 and the PCIe bus 53, and the initialization of the transmitting and receiving unit 40, are performed to set the image forming apparatus 1 to an available state. In this way, the start process during the ROM boot is completed.

Figure 9:
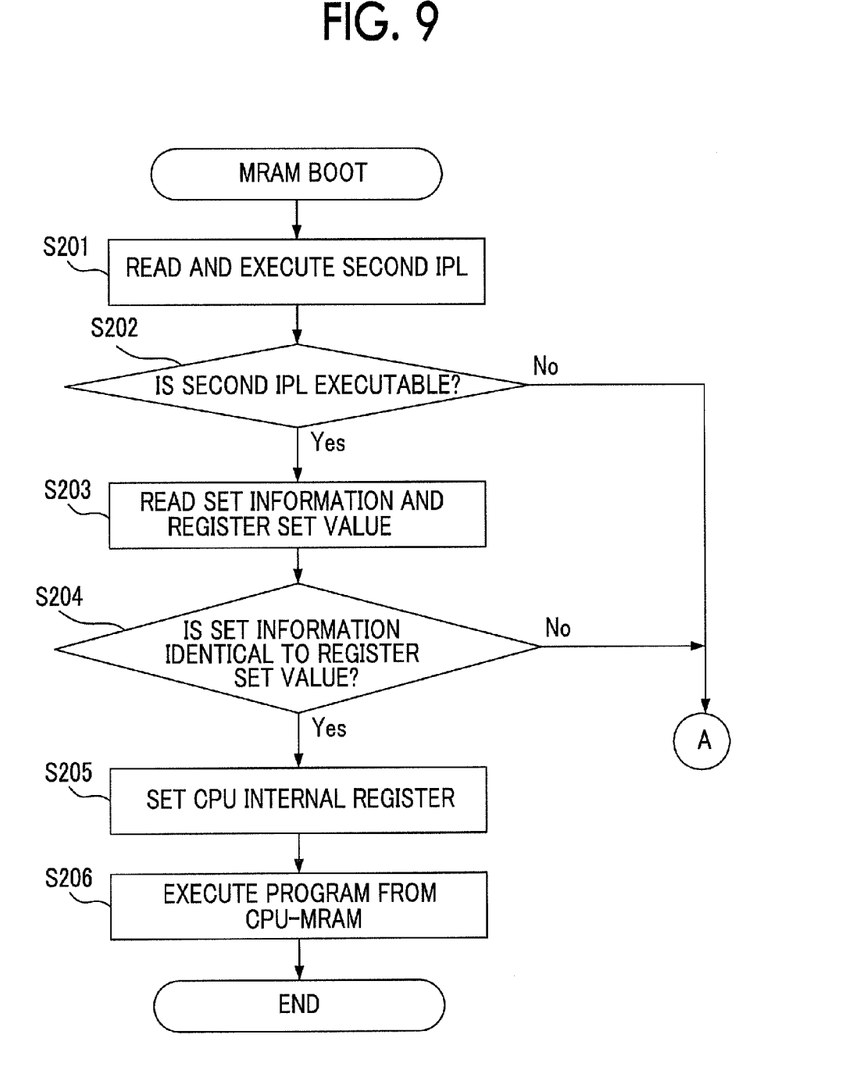
FIG. 9 is a flowchart illustrating the procedure of a start process during an MRAM boot.

FIG. 9 is a diagram illustrating the procedure of the start process during the MRAM boot in Step 14.

In the second or subsequent start process in which the MRAM boot is selected, the decompressed program obtained by the previous start process has been stored in the decompressed program storage area A122 of the second ROM area A12 of the CPU-MRAM module 61 and the set information obtained by the previous start process has been stored in the set information storage area A123 of the second ROM area A12 of the CPU-MRAM module 61.

In the second or subsequent start process in which the MRAM boot is selected, the mode information obtained by the previous start process has been stored in the MRAM mode storage unit 613 of the CPU-MRAM module 61 and the DRAM mode storage unit 623 of the CPU-DRAM module 62.

In addition, in the second or subsequent start process in which the MRAM boot is selected, the register set value obtained by the previous start process has been stored in the non-volatile setting register 724 provided in the CPU-RAM controller 72. Therefore, in the MRAM boot, unlike the ROM boot, the CPU-RAM controller 72 provided in the CPU 511 may access the CPU-RAM module 60 (the CPU-MRAM module 61 and the CPU-DRAM module 62) when the HW reset is released.

In the MRAM boot, first, the CPU core 71 reads the second IPL from the second reset vector storage area A121 of the second ROM area A12 arranged in the CPU-MRAM module 61 through the CPU-RAM controller 72 (Step 201). In this case, the CPU 511 monitors the execution of the second IPL by the CPU core 71 using the watchdog timer 74 and determines whether the second IPL is executable, that is, whether the CPU core 71 fails in fetching the program (reading the program) when the second IPL is executed (Step 202).

When the determination result in Step 202 is "Yes", the set information is read from the set information storage area A123 of the second ROM area A12 in the CPU-MRAM module 61 through the CPU-RAM controller 72, and the register set value is read from the non-volatile setting register 724 of the CPU-RAM controller 72 (Step 203). Then, it is determined whether the set information read in Step 203 is identical to the register set value (Step 204).

When the determination result in Step 204 is "Yes", the internal register (not shown) provided in the CPU core 71 is set (Step 205).

Then, the CPU core 71 completes the execution of the second IPL and starts to execute the program (decompressed program) read from the decompressed program storage area A122 (Step 206). Then, for example, the initialization of the CPU/PCIe interface 75, the initialization of the ASIC 521 through the CPU/PCIe interface 75 and the PCIe bus 53, and the initialization of the transmitting and receiving unit 40 are performed to set the image forming apparatus 1 to an available state. In this way, the start process by the MRAM boot is completed.

When the determination result in Step 202 is "No" and the determination result in Step 204 is "No", the start process by the ROM boot is stopped and the process proceeds to Step 15 shown in FIG. 7, that is, the ROM boot shown in FIG. 8.

For example, the determination result in Step 202 is "No" when there is an error in the second IPL stored in the second reset vector storage area A121 of the second ROM area A12 arranged in the CPU-MRAM module 61. For example, the determination result in Step 204 is "No" when there is an error in the set information stored in the set information storage area A123 of the second ROM area A12 in the CPU-MRAM module 61 or the register set value stored in the non-volatile setting register 724 of the CPU-RAM controller 72. In addition, the determination result in Step 204 is "No", for example, when the CPU-MRAM module 61 is exchanged after the previous start process and before the current start process.

In the second or subsequent start process, when the determination result in Step 13 is "Yes" and the determination result in Step 202 or Step 204 is "No", the ROM boot in Step 15 (FIG. 8) is executed again to perform the start process including the training sequence or the decompression of the compressed program and the image forming apparatus 1 is normally operated.

In the second or subsequent start process, when the determination result in Step 13 is "No" and the determination result in Step 202 or Step 204 is "Yes", the start process in which the initial setting is omitted is performed and the time required for the start process is reduced. In the flowchart of the ROM boot shown in FIG. 8, the step represented by a bold frame corresponds to the step omitted in the MRAM boot shown in FIG. 9. In this example, the start time by the MRAM boot is about 3.4 seconds shorter than that by the ROM boot. This is because the time (about 3.3 seconds) required to read, decompress, and store the compressed program in Step 111 shown in FIG. 8 is omitted.

In this exemplary embodiment, the CPU-MRAM module 61 and the CPU-DRAM module 62 form the CPU-RAM module 60, but the invention is not limited thereto. For example, only the CPU-MRAM module 61 may be used to form the CPU-RAM module 60.

In this exemplary embodiment, the CPU-MRAM module 61 is used as the non-volatile memory forming the CPU-RAM module 60, but the invention is not limited thereto. For example, an FeRAM (Ferroelectric RAM), a PRAM (Phase change RAM), or an ReRAM (Resistance RAM) may be used as the non-volatile memory used in the CPU-RAM module 60.

In this exemplary embodiment, the program executed by the computer (CPU 511) is stored in a computer-readable storage medium. For example, it is considered that a CD-ROM medium corresponds to the storage medium, a CD-ROM reader of the computer reads the program, and the program is stored in various memories, such as a hard disk, in the computer and is then executed. In addition, for example, it is considered that a program transmission device provides the program to a notebook PC or a portable terminal through the network. The program transmission device may include a memory that stores a program and a program transmission unit that provides the program through the network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an execution unit that executes a program;
   a main storage unit that includes a first non-volatile memory which is readable and writable and is capable of retaining stored information even when no power is supplied and is provided with a first storage area which stores the program executed by the execution unit and a second storage area which stores data generated by the execution of the program by the execution unit;

a connection unit that connects the execution unit and the main storage unit; and a condition storage unit that includes a second non-volatile memory which is readable and writable and is capable of retaining stored information even when no power is supplied and stores conditions which are set by the connection unit to transmit and receive the program and the data between the execution unit and the main storage unit, the conditions include maximum available clock frequency or signal timing.

2. The information processing apparatus according to claim 1, wherein the main storage unit further includes a volatile memory that is readable and writable and is not capable of retaining stored information when no power is supplied, and the volatile memory is provided with the second storage area.

3. The information processing apparatus according to claim 2, wherein the first non-volatile memory of the main storage unit is any one of an MRAM, an FeRAM, a PRAM, and an ReRAM.

4. The information processing apparatus according to claim 1, wherein the first non-volatile memory of the main storage unit is any one of an MRAM, an FeRAM, a PRAM, and an ReRAM.

5. The information processing apparatus according to claim 1, further comprising:

a setting unit that sets, as the set conditions, communication conditions for communication between the connection unit and the main storage unit before the connection unit connects the execution unit and the main storage unit, wherein the condition storage unit stores the communication conditions set by the setting unit as the set conditions.

6. The information processing apparatus according to claim 5, wherein the main storage unit further includes a volatile memory that is readable and writable and is not capable of retaining stored information when no power is supplied, and the volatile memory is provided with the second storage area.

7. The information processing apparatus according to claim 6, wherein the first non-volatile memory of the main storage unit is any one of an MRAM, an FeRAM, a PRAM, and an ReRAM.

8. The information processing apparatus according to claim 5, wherein the first non-volatile memory of the main storage unit is any one of an MRAM, an FeRAM, a PRAM, and an ReRAM.

9. An image forming apparatus comprising:

an image forming unit that forms an image on a recording material; and a control unit that controls an operation of the image forming unit, wherein the control unit includes:

an execution unit that executes a program used to control the image forming unit;

a main storage unit that includes a first non-volatile memory which is readable and writable and is capable of retaining stored information even when no power is supplied and is provided with a first storage area which stores the program executed by the execution unit and a second storage area which stores data generated by the execution of the program by the execution unit;

a connection unit that connects the execution unit and the main storage unit; and a condition storage unit that includes a second non-volatile memory which is readable and writable and is capable of retaining stored information even when no power is supplied and stores conditions which are set by the connection unit to transmit and receive the program and the data between the execution unit and the main storage unit, the conditions include maximum available clock frequency or signal timing.

10. A non-transitory computer readable medium storing a program that causes a computer to execute functions of:

executing a program;

setting a first storage area which stores the program and a second storage area which stores data generated by the execution of the program in a first non-volatile memory which is readable and writable and is capable of retaining stored information even when no power is supplied;

connecting the computer to the first non-volatile memory; and storing conditions which are set to transmit and receive the program and the data to and from the first non-volatile memory in a second non-volatile memory which is readable and writable and is capable of retaining stored information even when no power is supplied, the conditions include maximum available clock frequency or signal timing.

11. The non-transitory computer readable medium storing the program according to claim 10, wherein the program causes the computer to further execute a function of:

setting, as the set conditions, communication conditions for communication with the first non-volatile memory before connection to the first non-volatile memory, and in the function of storing the set conditions, the communication conditions are stored as the set conditions in a second non-volatile memory.

12. An information processing method comprising:

executing a program;

setting a first storage area which stores the program and a second storage area which stores data generated by the execution of the program in a first non-volatile memory which is readable and writable and is capable of retaining stored information even when no power is supplied;

connecting the computer to the first non-volatile memory; and storing conditions which are set to transmit and receive the program and the data to and from the first non-volatile memory in a second non-volatile memory which is readable and writable and is capable of retaining stored information even when no power is supplied the conditions include maximum available clock frequency or signal timing.

13. An information processing apparatus comprising:

an execution unit that executes a program;

a main storage unit that includes a first non-volatile memory and a second non-volatile memory, the first non-volatile memory and the second non-volatile memory being readable and writable and being capable of retaining stored information even when no power is supplied, the first non-volatile memory is provided with a first storage area which stores the program executed by the execution unit, and a second storage area which stores: 1) data generated by the execution of the program by the execution unit, and 2) a first startup program, the second non-volatile memory is provided with a storage area which stores a second startup program;

a connection unit that connects the execution unit and the main storage unit; and a condition storage unit that includes a third non-volatile memory which is readable and writable and is capable of retaining stored information even when no power is supplied and stores conditions which are set by the connection unit to transmit and receive the program and the data between the execution unit and the main storage unit, wherein when the information processing apparatus enters a starting process, the execution unit executes the first startup program if the starting process is not an initial starting process and the starting process is not generated by a timer reset from the execution unit, and otherwise the execution unit executes the second startup program.

* * * * *